April 14, 1959 L. M. GREENE 2,881,635
CONTROL ELEMENT
Filed Aug. 23, 1957 3 Sheets-Sheet 1
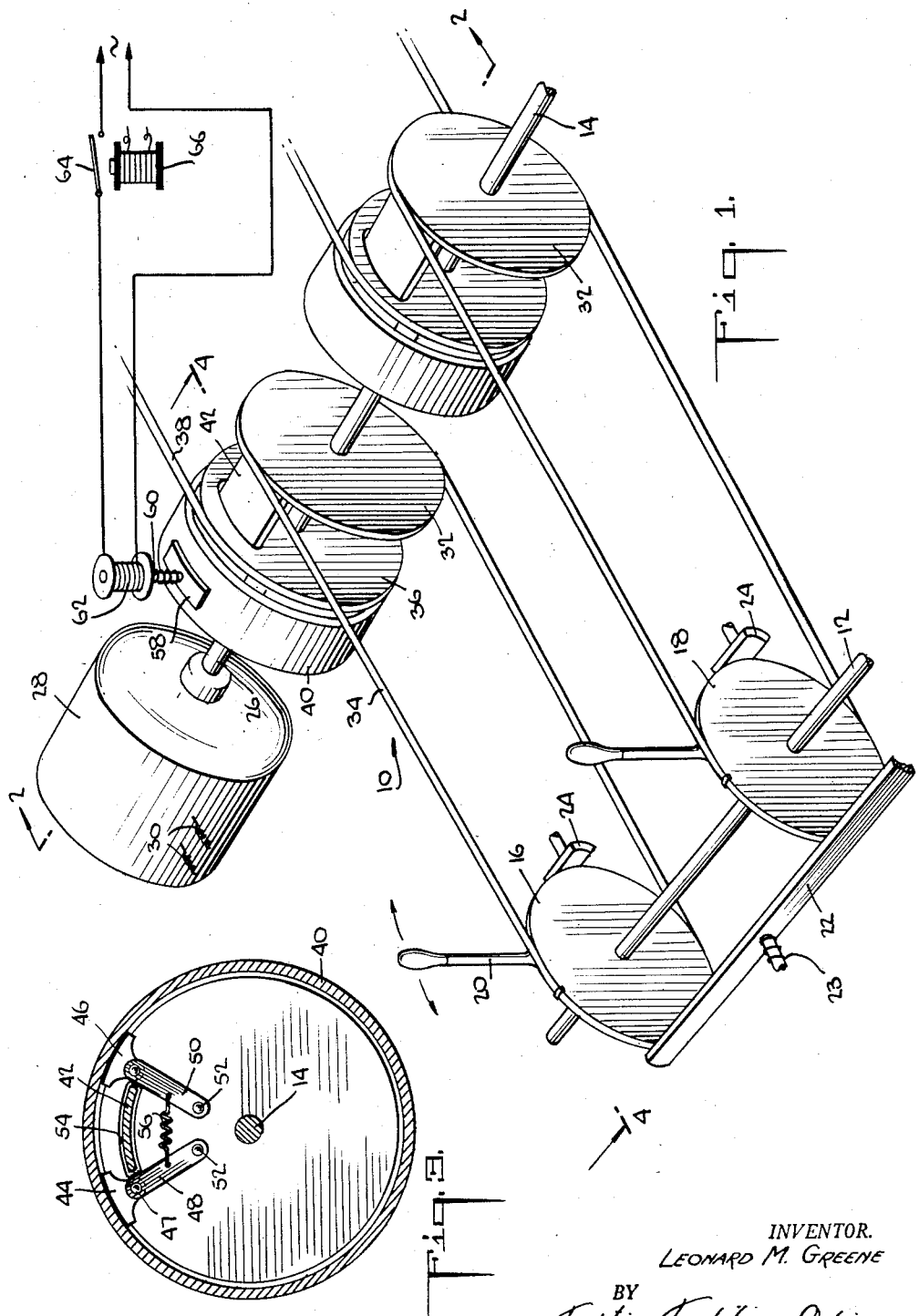
INVENTOR.
LEONARD M. GREENE
BY
ATTORNEYS April 14, 1959     L. M. GREENE     2,881,635
CONTROL ELEMENT
Filed Aug. 23, 1957     3 Sheets-Sheet 2
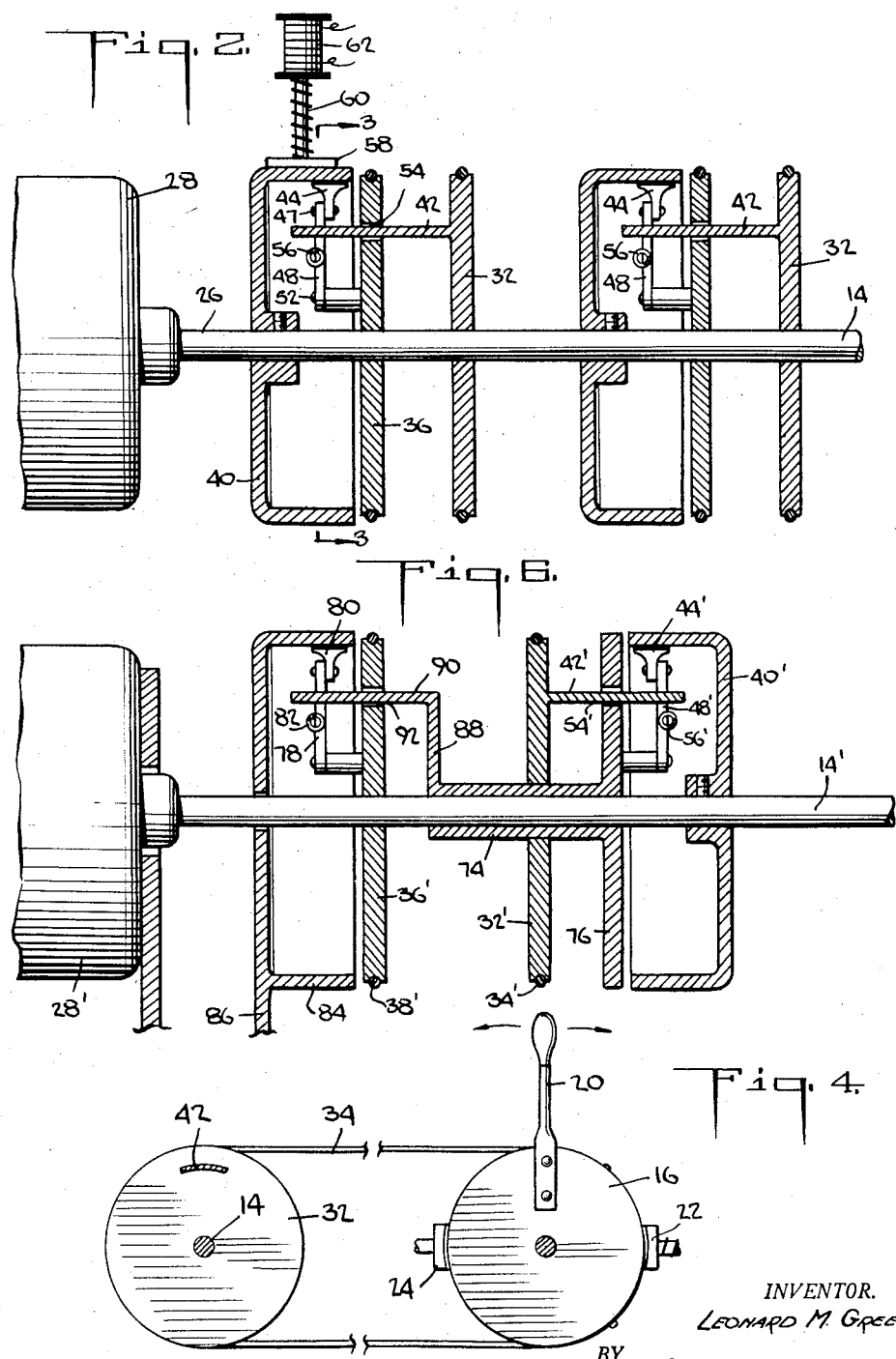
INVENTOR.
LEONARD M. GREENE
BY
ATTORNEYS April 14, 1959  L. M. GREENE  2,881,635
CONTROL ELEMENT
Filed Aug. 23, 1957  3 Sheets-Sheet 3
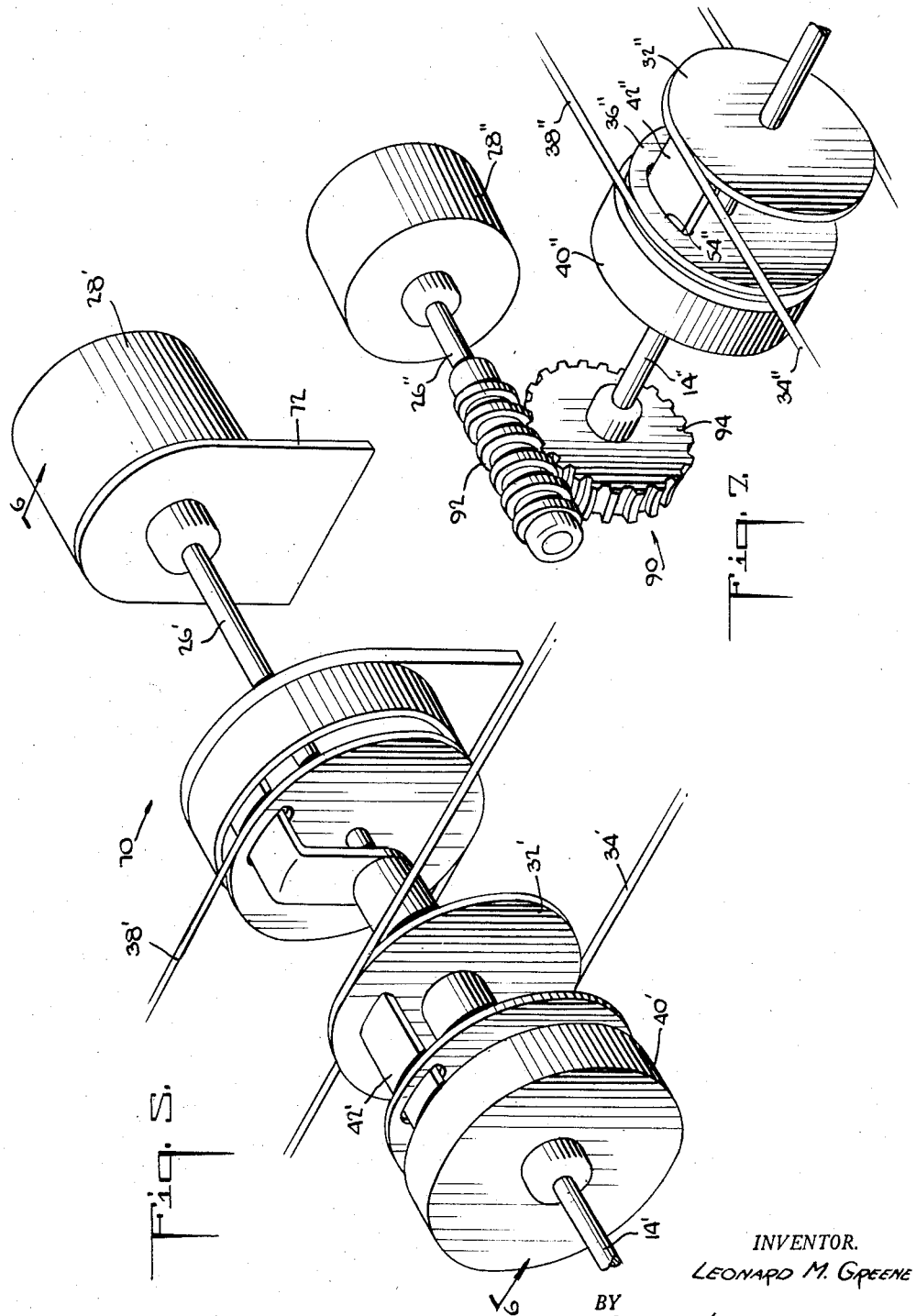
INVENTOR.
LEONARD M. GREENE
BY
ATTORNEYS United States Patent Office 2,881,635
Patented Apr. 14, 1959

2,881,635

CONTROL ELEMENT

Leonard M. Greene, Scarsdale, N.Y., assignor to Safe Flight Instrument Corporation, White Plains, N.Y., a corporation of New York Application August 23, 1957, Serial No. 679,816

8 Claims. (Cl. 74—480)

This invention relates to a control element and, more particularly, is concerned with a system for controlling multiple driven elements with a common secondary driver automatically overridable by individual primary drivers.

There are many situations in the control of present-day complex mechanical equipment where plural mechanical elements must be operated individually or simultaneously at will. For example, if a plurality of engines drive a single conveyance, it is desirable upon certain occasions to increase or decrease the power outputs of the engines concurrently, and upon other occasions to individually increase or decrease the power output of one or more of the group of engines while either leaving the remaining engines alone or allowing these engines to be controlled by servo equipment. This is particularly the case in multi-engine aircraft where a pilot is required to manually individually adjust the power outputs of the different engines so as to make them carry proper shares of the load and yet wherein servo equipment controls the engines after their individual adjustment.

It is an object of the present invention to provide a control system which is such that plural elements such, for instance, as the throttles of a multi-engine aircraft, are under a common servo control and yet, when the pilot wishes to individually regulate any selected throttle, the mere movement of a manual control lever will override the servo control of the associated throttle while leaving the remaining throttles under servo control.

More basically, it is an object of my invention to provide a control system of the character described in which plural driven elements are concurrently actuated by a secondary control which automatically is overriden in the case of any one or more driven elements when a primary control for such element or elements is actuated.

It is another object of my invention to provide a control system of the character described which is particularly simple, constitutes comparatively few parts, and is reliable and foolproof in operation.

It is another object of my invention to provide a control system of the character described which is highly compact, easy to install, and relatively inexpensive to manufacture.

Other objects of my invention in part will be obvious and in part will be pointed out hereinafter.

My invention accordingly consists in the features of construction, combinations of elements and arrangements of parts, which will be exemplified in the control systems hereinafter described and of which the scope of application will be indicated in the appended claims.

In the accompanying drawings, in which are shown various possible embodiments of my invention, Fig. 1 is a perspective schematic view of a control system constructed in accordance with my invention;

Fig. 2 is a longitudinal sectional view along the secondary control shaft, the same being taken substantially along the line 2—2 of Fig. 1;

Fig. 3 is an enlarged sectional view taken substantially along the line 3—3 of Fig. 2 and illustrating one of the irreversible mechanisms used in my control system;

Fig. 4 is a fragmentary sectional view taken substantially along the line 4—4 of Fig. 1;

Fig. 5 is a view similar to Fig. 1 of a control system embodying a modified form of my invention;

Fig. 6 is a longitudinal sectional view along the secondary control shaft of the system shown in Fig. 5, the same being taken substantially along the line 6—6 of said figure; and Fig. 7 is a view similar to Fig. 1 of a control system embodying another modified form of my invention.

Referring now in detail to the drawings, and more particularly to Figs. 1–4, the reference numeral 10 denotes a control system embodying one form of my invention. Said system includes a primary control shaft 12 and a secondary control shaft 14 which are spaced from one another. These shafts may be close together; for example, they both may be located in or adjacent the cockpit of an airplane, or, optionally, the shafts can be as far apart as they might be, for instance, if this system were being utilized for controlling plural engines in a submarine or boat. For convenience, I have shown the two shafts as parallel to one another and horizontally disposed, these being the positions in which said shafts conveniently are arranged when my system is employed in a multiple engine aircraft.

The term "primary control shaft" may be misleading in that the shaft 12 does not actually control anything. However, the shaft, which is stationary, has rotatably mounted on it a plurality of primary control driver elements 16, 18. These elements have been conveniently illustrated as sheaves, i.e., pulleys. However, it will be appreciated by skilled workers in this art that the elements 16, 18 may take on other forms or shapes, e.g., arcuate segments or even simple levers. To facilitate manipulation of the primary control driver elements, each of the sheaves desirably has a manually manipulatable lever type handle 20 fixed on the side thereof. In a conventional installation the sheaves will be concealed in a housing having slots through which the handles protrude for convenient operation, the primary control driver elements 16, 18 serving as the driver elements of a simple kinematic train. It also is well to note at this point that each primary control driver element 16, 18 is part of one module of the control system, there being one such module provided for each driven element to be controlled, i.e., for each throttle, so that in a control system for a four-engine aircraft there would be four primary control driver elements and four handles 20. That the two primary control driver elements illustrated are not necessarily all that are present is indicated by a broken end of each shaft 12, 14.

In order to prevent drifting of the handles 20, I provide a light frictional drag on the sheaves 16, 18, this conveniently taking the form of a bar 22 which rests lightly on the peripheries of all of said sheaves and thus creates a slight frictional restraint which will not prevent the sheaves from turning with comparative freedom but will deter rotation of these sheaves of their own volition or because of vibration of the aircraft. The amount of frictional restraint is only a few ounces-inches, e.g., three or four ounces-inches, so that it is hardly noticeable and will not prevent the operation of my control system in the manner hereinafter to be described. A spring 23 lightly presses the bar 22 against the sheaves to engender the requisite frictional drag.

Furthermore, the primary control driver elements are individually provided with brakes 24 which can be selectively operated from handles (not shown), so that if under some unusual circumstance it is desired not to move the primary control driver element for any given throttle, the same can be accomplished. This may be the case, for example, where one of the engines has failed and it is desired to hold the throttle for it in idling position.

The secondary control shaft 14 is connected to the output shaft 26 of a servo motor having input leads 30. This motor is regulated by an automatic pilot, a typical automatic piloting system being shown in the co-pending application of Leonard M. Greene and Dale H. Nelson, filed February 5, 1954, for Airplane Instruments, Serial No. 408,382, and assigned to the owner of the present application. The servo motor will turn its output shaft 26 to angular positions corresponding to the desired engine throttle positions which should be assumed for any given set of circumstances.

For each module there is provided a sheave 32 which is freely rotatable on the secondary control shaft and is driven by any suitable motion transmitting mechanism from a corresponding sheave on the primary control shaft. For instance, a cable 34 or the like connects each sheave 32 to a corresponding sheave 16 or 18 on the primary control shaft so that each sheave on the primary control shaft is linked to a different sheave on the secondary control shaft. Thus the sheaves 32 constitute extensions of the primary control driver elements and may themselves be considered primary control driver elements.

Each module furthermore includes a second sheave 36 which is freely rotatable on the secondary control shaft 14 and is adjacent the sheave 32 for the same module. Each sheave 36 has trained about it a cable 38 or the like which is connected to the driven element, e.g., to a throttle of one of the engines. Any other suitable motion transmitting element may be used in lieu of the cable, e.g., a linkage, servo, or hydraulic system. Thus the sheaves 36, in effect, constitute the individual driven elements.

Each module additionally is provided with a secondary control driver element 40 which is fast on the secondary control shaft 14 so as to turn therewith.

Means is included for turning each driven element 36 upon rotation of the associated secondary control driver element 40, this means being so constructed that if the primary control driver element 32 is actuated (turned or prevented from turning), the primary control driver element automatically will take over control of the driven element regardless of movement or non-movement of the secondary control driver element. More particularly, the secondary control driver element 40 is connected to the driven element 36 by a disengageable means such, for instance, as a coupling, which automatically is disengaged upon movement of the primary control driver element relative to the secondary control driver element, and the primary control driver element is connected to the driven element by a direct coupling which is rendered effective upon a slight movement of the primary control driver element relative to the driven element. Phrased differently, the couplings are so constructed that positive actuation or holding of the primary control driver element will disengage the first coupling and will render the second coupling effective.

In the particular control system now being described I effect the desired functions by the use in each module of a mechanism known to workers in the art as an "irreversible locking control element." Essentially in this type of element there are provided a driving member which usually is movable under manual control, a driven member which is moved through a slight lost motion coupling by the driving member, and a stationary member. The driven member is clutched to the stationary member in such a manner that if no force is applied to the driving member, the driven member engages the stationary member and therefore is itself held stationary. Accordingly, if any force is applied tending to shift the driven member, i.e., a force other than a force applied by the driving member, the driven member cannot move due to the connection between it and the stationary member. On the other hand, if the driving member is moved, such movement disengages the clutch connecting the driven member to the stationary member so that movement of the driving member causes movement of the driven member. Irreversible locking control elements of the foregoing nature are illustrated in United States Letters Patent No. 2,394,384, to Bevan G. Horstmann, for a Dual Control System, dated February 5, 1946, and United States Letters Patent No. 2,703,499, to James H. Reid for an Irreversible Locking Control Element, dated March 8, 1955.

In my control system a plurality of irreversible locking control elements are employed, one for each module. In each module the primary control driver element constitutes the driving member of the irreversible locking control element; the driven element constitutes the driven member of the irreversible locking control element; and the secondary control driver element constitutes the stationary member of the irreversible locking control element, said stationary member being rendered rotatable for the purposes of my invention, and all of the secondary control driver elements being tied together for common rotation.

More specifically, in each module the sheave 32 (the primary control driver element) is formed with an integral tongue 42 that extends toward the secondary control driver element which constitutes a hollow drum having one open side facing the sheave 32 and through which the tongue 42 extends. The sheave 36 which constitutes the driven element is located between the sheave 32 and the open side of the drum 40.

Said sheave 36 is connected to the drum 40 for rotation therewith by a friction clutch including a pair of brake shoes 44, 46 (see Fig. 3). Each of these shoes is pivoted at 47 to a different toggle arm 48, 50 extending radially inwardly from the shoes. The inner ends of the toggle arms are pivoted on pins 52 carried by the sheave 36. The two arms are located on opposite sides of an arcuate slot 54 through which the tongue 42 extends, the side edges of the tongue being located immediately adjacent the sides of the two toggle arms with a slight clearance between the tongue and the toggle arms. A spring 56 urges the two arms toward one another. The lengths of the toggle arms and the radial dimensions of the shoes are such that the spring jams the shoes against the interior periphery of the drum. In other words, the radial distance from each pivot point 52 to the interior of the brake drum is slightly less than the combined distance from the pin 52 to the pivotal connection 47 between the toggle arm and the brake and the radial distance from said pivotal connection 47 to the drum engaging surface of the shoe. Moreover, each pivotal connection 47 is on the side opposite from the spring of the shortest, i.e., radial, distance from the associated pin 52 to the interior periphery of the drum. Accordingly, as the spring urges the two toggle arms toward one another, it jams the brake shoes against the inner surface of the drum thereby frictionally interengaging the sheave 36 and drum 40 for common rotation. Hence, with the brake shoes in their foregoing condition, if the drum 40 is turned, it will turn the sheave 36 with it as long as the sheave 32 is not turned relative to the drum 40 and sheave 36.

However, if the sheave 32 is turned relative to the drum 40 and sheave 36, the tongue 42 will press against one or the other of the toggle arms depending upon the direction of relative rotation. If, for example, the sheave 32 is turned in a counter-clockwise direction as viewed in Fig. 1 (clockwise as viewed in Fig. 3), the tongue 42 will press against the toggle arm 50 and will release the frictional engagement between the brake shoe 46 and the drum 40. This is the shoe that locks the sheave 36 to the drum 40 for common rotation in a counter-clockwise direction as viewed in Fig. 1 (clockwise as viewed in Fig. 3). Thus, release of the brake shoe 46 will permit the sheave 36 to turn relative to the drum 40 when the tongue 42 presses against an end of the slot 54 after shifting the engaged toggle arm. The shoe 44 does not prevent this rotation, since the direction of movement is such as to lessen the frictional engagement between it and the drum 40. Therefore when the sheave 32 is turned in either direction, it will turn the sheave 36 with it, even though the drum 40 is stationary.

To summarize, if the drum 40 is stationary and the sheave 32 is not moved, the sheave 36 will be unable to turn. If the sheave 32 is held stationary by hand or a brake 24 and the drum 40 is turned, said drum will turn independently of the sheaves 32, 36 which will be maintained in common angular relationship. If the sheave 32 is turned it will turn the sheave 36 regardless of movement or non-movement of the drum 40. If the drum 40 is turned and the sheave 32 is not held by hand, the drum 40 will turn the sheaves 32, 36, the motion from the drum to the sheave 32 being transmitted by pressure of one or the other toggle arms against the tongue 42 which is not sufficiently restrained by the drag bar 22 to move the toggle arm against the pressure exerted by the spring 56.

Means also is included to maintain the drums 40 stationary so that when neither the servo motor 28 nor the handles 20 are being moved, the drums can act as so-called "grounds" or anchors for the sheaves 36 whereby to prevent the latter from turning if forces are exerted on the throttle cable 38. As shown in Fig. 1, said grounding means comprises a brake shoe 58 arranged to engage the outer surface of one of the drums 40 under the influence of a spring 60. An electromagnet 62 when energized pulls the shoe 58 away from the drum against the opposition of the spring 60. The energizing coil of the electromagnet 62 is connected to a source of power through a normally open switch 64 arranged to be closed by an iron core solenoid 66. This solenoid is connected in parallel with the leads 30 for the servo motor, so that each time the servo motor is energized, the solenoid 66 likewise is energized to close the switch 64 and thereby pull the brake shoe 58 away from the drums 40. Thus, the servo motor when actuated is free to turn the drum 40. On the other hand, when the servo motor is idle, the brake shoe 58 will hold the drums stationary.

In the operation of a multi-engine airplane in which there is a different module, including a handle 20, for each throttle of each engine, a control system incorporating the form of my invention shown in Fig. 1 operates as follows:

When the pilot has set the airplane to operate under automatic control for the engine, the friction drag engendered by the bar 22 will prevent the handles 20 from moving of their own volition. However, the individual brakes 24 are released. If the servo motor is idle, the brake shoe 58 will engage one of the brake drums 40 and since the brake drums 40 for all the modules are rigidly fixed to the secondary control shaft 14, all of these drums will maintain a fixed angular position. Hence, if any one or more of the throttle cables 38 tries to move because of stresses imposed on it due, for example, to vibration or bucking strains on the throttle, the cable will not be able to shift because the sheave 36 cannot move with respect to the drum 40, being held fixed by engagement of the brake shoes 44 and 46 against the internal surfaces of the drum. If the servo motor turns, the brake shoe 58 will lift and the motor will turn all of the sheaves 36 and 32 as long as the pilot does not touch the handles 20 or set any of the brakes 24. Accordingly, the servo motor 28 commonly controls all of the throttles.

However, it is accepted that it is necessary to relatively adjust the throttles of the different engines when tuning the engines up preparatory to take-off, or when tuning the engines after take-off and during flight, or to take into account minor or major malfunctioning of one or more engines. This is accomplished, in accordance with my invention, with great ease. To alter the relative setting of any throttle, the pilot simply moves the handle 20 for the engine that is to be manually adjusted. Movement of the handle 20 rotates the sheave 32 relative to the secondary control shaft 14 and causes the tongue 42 to shift in the slot 54 a slight distance sufficient to release one or the other of the brake shoes 44, 46 and then press against an end of the slot so that the sheave 36 is turned about the shaft 14 relative to the drum 40 under slave control of the sheave 32. It will be observed that such control movement of the sheave 36 under the regulation of the handle 20 is automatically accomplished and completely independent either of any given position of the drum 40 or of any movement of the drum 40 so long as the sheave 32 is being manually controlled.

This arrangement is particularly useful since when a pilot is changing the throttle setting of one of the engines, the servo motor will come into play and oppositely change the throttle setting of the remaining engines. More specifically, if the pilot advances the throttle of one of the engines by moving a handle 20 while the servo motor control is in effect, the total engine power supplied will exceed the demand. This will be recognized by the sensing means governing the servo motor which thereupon will transmit a signal to the servo motor that causes it to turn the shaft 14 in a direction to retard throttle settings, and such retarding action will retard the throttle settings of all the throttles except the one which is being manually controlled by the pilot. Such an arrangement is in contrast to previous systems wherein a pilot had to manually manipulate each one of the throttles every time that he wished to vary the setting of any one of them. The new system automatically correctively adjusts all the remaining throttles when the setting of any one of them is changed by hand. It has the further advantage that any throttle setting can be changed by hand while the over-all system still remains under servo control, so that not only are the individual throttle settings changeable with greater facility and speed, but it is not necessary to disconnect the servo control and thereby, under certain circumstances, possibly endanger the safety of the airplane.

In Figs. 5 and 6 I have illustrated a modified form of my invention, the variation residing only in the means to hold stationary during non-energization of the servo motor the drums which constitute the secondary control driver elements. For the purpose of convenience, all parts of the system shown in Figs. 5 and 6 which are the same as parts shown in the system of Figs. 1–4, will be given the same reference numeral with a prime to distinguish between the two systems.

More specifically, referring to Figs. 5 and 6, I have provided a control system 70 including a servo motor 28' mounted on a stationary plate 72. The output shaft 26' of the servo motor drives a secondary control shaft 14' on which there is rigidly affixed a drum 40'. It may be mentioned at this point that in Figs. 5 and 6 I have only shown one module and it will be understood that there are several such modules, one for each of the different throttles of a multi-engine aircraft. A cable 34' connects a sheave 32' to an individual manual control and a cable 38' connects a sheave 36' to one of the driven elements, e.g., to a throttle of one of the engines. The sheave 32' rotates about a tubular sleeve 74 which is rotatable in turn about the secondary control shaft 14'. A tongue 42' extends through a slot 54' in a plate 76 rotatable about the shaft 14' with the sleeve 74. The plate 76 is connected to the drum 40' by a pair of toggle arms 48', 50' and brake shoes 44', 46' (the arm 50' and shoe 46' cannot be seen in the drawings of the second form of my invention but are identical to the arm 50 and shoe 46 shown in Fig. 3), biased toward one another by a spring 56', the arrangement being identical to that described in detail with respect to the first form of my invention.

The sheave 36' is mounted to rotate about the secondary control shaft 14'. However, unlike in the system shown in Fig. 1, the sheave 36' does not carry the pins for the toggle arms 48', 50'. Instead, said sheave mounts a second pair of toggle arms 78 and brake shoes 80. The toggle arms 78 are biased toward one another by a spring 82. Said shoes are arranged to engage the interior surface of a brake drum 84 secured as by a plate 86 to ground, so that the drums 84 are stationary at all times, the toggle and shoe arrangement being as described with reference to Figs. 1–4. The shaft 14' extends through the center of the drum 84. Accordingly, it will be appreciated that the sheave 36' normally is locked to the drum 84 and therefore is immovable, that is to say, any stresses transmitted along the cable 38' will be unable to rotate the sheave 36' with respect to the shaft 14'.

However, the sleeve 74 is provided with a radial arm 88 on which there is mounted a tongue 90 that extends through a slot 92 in the sheave 36' in a position such as to lie between the toggle arms 78 in a manner similar to the tongues 42 and 42'. It now will be seen that if the cable 34' is moved by a pilot, the tongue 54' will engage one of the toggle arms 48', 50', to release the connection between the plate 76 and drum 40'. Continued movement of the sheave 32' will cause the edge of the tongue 42' to engage an end of the slot 54' so as to turn the plate 76, sleeve 74, arm 88 and tongue 90. The tongue 90 will engage one of the toggle arms 78 to release the sheave 36' for rotation relative to the drum 84 and shaft 14. Thereby movement of the cable 34' will cause a corresponding movement of the cable 38' when the servo motor 28' either is idle or energized.

When the servo motor 28' is idle, however, and the pilot does not touch the manual control, the sheave 36' will be unable to move, since it will be locked to the drum 84 by the brake shoes 80.

When the servo motor 28' is energized, it will turn the drum 40'. This will, through the toggle arms 48', 50' and through the brake shoes 44', 46', turn the plate 76 and thereby turn the tongue 90 which releases the sheave 36' from the stationary drum 84, thereby permitting this movement of the drum 40' to turn the cable 38', providing, of course, that the sheave 32' is free to turn, i.e., is not held stationary by a pilot. During this movement the sheave 32' is a slave as has been described in connection with the first form of my invention.

It will be appreciated that the operation of the system 70 is identical to that of the system shown in Figs. 1–4 except for the means to hold the secondary control driver element stationary when the servo motor is idle. As mentioned above, several modules each consisting of a pair of drums 40', 84 and the other elements shown in Figs. 5 and 6 are utilized, one module for each one of the different throttles to be controlled.

In Fig. 7 I have shown still another system 90 embodying my invention, which, like the system of Figs. 5 and 6, differs from Fig. 1 only in the means for holding the secondary control driver element stationary when the servo motor is not turning. In the system 90, all of the parts which are the same as those of Figs. 1–4 will be denoted by the same reference numerals, but will bear double primes to distinguish therefrom.

The system 90 includes a servo motor 28", the output shaft 26" of which is connected to a secondary control shaft 14" through a one-way drive gear train consisting of a worm 92 secured on the shaft 26" and a worm gear 94 meshing with the worm 92 and secured on the shaft 14". In other respects, the system 90 is identical with the system 10, the worm and the worm gear meshing therewith serving to hold the drum 40" stationary when the servo motor is not actuated, and thus, in effect, performing the same function as that of the brake shoe 58 and switch 64.

More particularly, the drum 40" is rigidly fixed to the shaft 14". The shaft 14" has rotatably mounted thereon a pair of sheaves 32" and 36", the sheave 36" being engaged by a cable 38" connected to the throttle. The sheave 36" lies between the sheave 32" and the open face of the drum 40". A tongue 42" carried by the sheave 32" extends through a slot 54" in the sheave 36" and is arranged to engage a pair of toggle arms (not shown) which are identical with the toggle arms 48 and 50 of the control system shown in the first form of my invention. These toggle arms carry brake shoes that engage the interior surface of the drum 40" under the influence of a spring, likewise not shown, but identical to the spring 56.

It will be seen that when the servo motor 28" is turned while the pilot's hands are off the manual control for the cable 34", the shaft 14" will turn the drum 40" which, through the brake shoes and toggle arms, will turn the cable 38", the sheave 32" following by virtue of engagement between the tongue 42" and toggle arms, which, however, is not strong enough to disengage either one of the brake shoes. When the servo motor is not actuated, the drum 40" will be held stationary by the meshing engagement between the worm and worm gear, so that the cable 38" cannot move. With the servo motor either idle or actuated, movement of the cable 34" will, through the tongue 42", disengage the friction connection between the sheave 36" and the drum 40" so that the sheave 36" will turn with the sheave 32".

It thus will be seen that I have provided control systems which achieve the various objects of my invention and are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. A control system for a plurality of driven elements, said system including a plurality of modules, each module comprising a different one of said driven elements, a primary control driver element, a secondary control driver element, disengageable means coupling the driven element to the secondary control driver element, means permanently directly coupling the primary control driver element to the driven element, and means automatically disengaging the first-named coupling means upon operational control movement of the primary control driver element relative to the secondary control driver element, said system further including means interconnecting the secondary control driver elements of all the modules for common movement, means for jointly moving all of said secondary control driver elements, and means for holding the secondary control driver elements stationary when the joint moving means is idle.

2. A control system for a plurality of driven elements, said system including a plurality of modules, each module comprising a different one of said driven elements, a primary control driver element, a secondary control driver element, and an irreversible locking control connecting the driven element, the primary control driver element and the secondary control driver element in a manner such that the driven element is locked to the secondary control driver element and is automatically unlocked therefrom and movable with the primary control driver element when the primary control driver element is moved for operational control relative to the secondary control driver element, said system further including means interconnecting the secondary control driver elements of all the modules for common movement, means for jointly moving all of said secondary control driver elements, and means for holding the secondary control driver elements stationary when the joint moving means is idle.

3. A control system for a plurality of driven elements, said system including a plurality of modules, each module comprising a different one of said driven elements, a primary control driver element, a secondary control driver element, means coupling the secondary control driver element to the driven element, means coupling the primary control driver element to the driven element, said second-named permanently coupling means automatically overriding the first-named coupling means upon operational control movement of the primary control driver element relative to the secondary control driver element, said system further including means interconnecting the secondary control driver elements of all the modules for common movement, means for jointly moving all of said secondary control driver elements, and means for holding the secondary control driver elements stationary when the joint moving means is idle.

4. A control system for a plurality of driven elements, said system including a plurality of modules, each module comprising a different one of said driven elements, a primary control driver element, a secondary control driver element, disengageable means coupling the driven element to the secondary control driver element, means permanently directly coupling the primary control driver element to the driven element, and means automatically disengaging the first-named coupling means upon operational control movement of the primary control driver element relative to the secondary control driver element, said system further including means interconnecting the secondary control driver elements of all the modules for common movement, servo means for jointly moving all of said secondary control driver elements, and means for holding the secondary control driver elements stationary when the joint moving means is idle.

5. A control system for the throttles of a multi-engine airplane, said system including a plurality of modules, each module comprising a driven element kinematically connected to a different one of the throttles, a manually controllable handle, a primary control driver element kinematically connected to said handle, a secondary control driver element, disengageable means coupling the driven element to the secondary control driver element, means permanently directly coupling the primary control driver element to the driven element, and means automatically disengaging the first-named coupling means upon operational control movement of the primary control driver element relative to the secondary control driver element, said system further including means interconnecting the secondary control driver elements of all the modules for common movement, servo means for jointly moving all of said secondary control driver elements, and means for holding the secondary control driver elements stationary when the joint moving means is idle.

6. A control system for a plurality of driven elements, said system including a plurality of modules, each module comprising a different one of said driven elements, a primary control driver element, a secondary control driver element, disengageable means coupling the driven element to the secondary control driver element, means permanently directly coupling the primary control driver element to the driven element, and means automatically disengaging the first-named coupling means upon operational control movement of the primary control driver element relative to the secondary control driver element, said system further including means interconnecting the secondary control driver elements of all the modules for common movement, servo means for jointly moving all of said secondary control driver elements, and means for holding the secondary control driver elements stationary, said last-named means being effective when the joint moving means is idle and ineffective when the joint moving means is operative.

7. A control system as set forth in claim 1 wherein the holding means constitutes a stationary element and disengageable means connecting the driven element to the stationary means, said disengageable means being automatically disengaged upon movement of the primary control driver element or the secondary control driver element.

8. A control system as set forth in claim 1 wherein means is provided to lightly restrain movement of the primary control driver elements.

References Cited in the file of this patent

UNITED STATES PATENTS

| | | |
|---|---|---|
| 1,549,697 | Whittaker et al. | Aug. 11, 1925 |
| 1,641,567 | Barling | Sept. 6, 1927 |
| 1,747,334 | Sundstedt | Feb. 18, 1930 |
| 2,268,601 | Knox | Jan. 6, 1942 |
| 2,421,494 | Glass et al. | June 3, 1947 |
| 2,579,959 | Peterson | Dec. 25, 1951 |
| 2,789,667 | Tannenbaum et al. | Apr. 23, 1957 |
| 2,790,522 | Senkowski et al. | Apr. 30, 1957 |
| 2,794,920 | Salmet | June 4, 1957 |